July 27, 1926.

A. G. COOLEY

PHOTO TELEGRAPHY

Filed Dec. 11, 1924

1,593,651

Inventor:
Austin G. Cooley,
by Roberts, Roberts & Cushman
Attys.

Patented July 27, 1926.

1,593,651

UNITED STATES PATENT OFFICE.

AUSTIN G. COOLEY, OF CAMBRIDGE, MASSACHUSETTS, ASSIGNOR OF FORTY-NINE ONE-HUNDREDTHS TO CHARLES C. HENRY, OF STRAWBERRY POINT, IOWA.

PHOTOTELEGRAPHY.

Application filed December 11, 1924. Serial No. 755,337.

This invention relates to method and apparatus for telegraphing by wire or radio subject-matter such as photographs, printed-matter, etc., and has for its principal objects to increase the speed and clarity of transmission, to transmit either like or opposite representation of the subject-matter (e. g. positive from negative or positive from positive) and to transmit in such manner that the transmission impulses may also be employed to synchronize the receiving apparatus as disclosed for example in co-pending application Serial No. 755,336, filed on even date herewith.

In its preferred embodiment the invention involves the use of an audion at the sending station with means for continuously supplying a pulsating potential to the audion grid and means for leaking electrical charge from the grid in response to light. Preferably the pulsating potential is alternating current of constant frequency and low amplitude, and the light responsive means constituting the variable grid leak may comprise any suitable photo-electric cell. The source of pulsating current is connected in a series circuit including the grid and a high impedance and the photo-electric cell is connected in parallel with the high impedance. The high impedance may be in the form of resistance or reactance or both. The branch circuit including the photo-electric cell preferably spans both the high resistance and the source of pulsating current although it may bridge only the high resistance. By adjusting the position of the characteristic curves with respect to the average grid potential, the amplitude of variation of the plate current may be caused either to increase or decrease in response to light striking the cell. This relative shifting of the characteristic curves (grid-voltage plate current, and grid-voltage grid-current curves) is readily accomplished by varying the plate potential supply or adjusting the filament voltage. For example, at one adjustment increase of light on the cell may cause increase amplitude of variation of the plate current whereas at another adjustment increase of light may cause decrease amplitude of variation of the plate current. While the average potential on the grid may be adjusted in several ways it is preferably adjusted by varying the potential in the plate circuit, thereby varying the average charge imparted to the grid from the cathode.

For the purpose of illustration I have shown a preferred form of the invention in the accompanying drawings in which.

Figure 1:
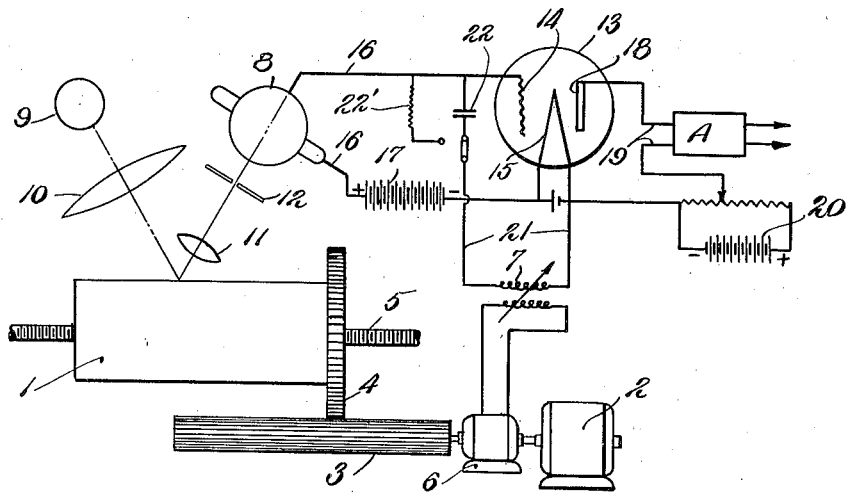
Fig. 1 is a diagrammatic representation of the sending apparatus.

In the particular embodiment of the invention chosen for the purpose of illustration the transmitting apparatus comprises a drum 1 upon which the photograph, printed matter or the like, is wrapped, a motor 2 for rotating the drum through gears 3 and 4, the drum threading axially on a stationary shaft 5 as it rotates, a generator 6 for supplying alternating current to variable transformer 7 at a suitable frequency (say 1000 cycles or higher) which is proportional to the speed of drum 1, a photo-electric cell 8, a light source 9, lenses 10 and 11 for focusing upon said cell through apertured plate 12 a pencil of light reflected from the photograph or the like, an audion 13 having its grid 14 and cathode 15 connected to said cell through an input circuit 16 containing a source of potential 17, and having its cathode 15 and anode 18 connected to an output or plate circuit 19 containing a variable potential source 20, and an amplifier A interposed in the output circuit. This amplifier may be of audion or other suitable type. The transformer 7 is connected across the input circuit 16 by circuit 21 containing a low capacity (e. g. 0.00001 mf.) condenser 22 or high resistance 22' (e. g. of the order of five to twenty-five megohms, preferably the latter, depending on the type of audion, etc.).

In transmitting, motor 2 drives the drum 1 at a speed proportional to the frequency of the alternating current from generator 6 and the light from source 9 traces a spiral around the periphery of the drum as the latter is threaded along shaft 5. The alternating potential from transformer 7, acting upon the grid of audion 13, causes pulsations or impulses to be transmitted from the transmitting station to the receiving station. The light reflected from the subject-matter on drum 1 to the photo-electric cell varies the resistance of circuit 16 in accordance with variations in the reflection ability of the successive points of the subject-matter. This variable resistance in circuit 16 serves as a variable grid leak to vary the potential on grid 14 and thereby varies the aforesaid impulses.

It has been found that by varying the potential of battery 20 either like or opposite reproduction can be effected, that is, either a positive or a negative can be produced at the receiving station when using a negative (or a positive) at the transmitting station. For example, like reproduction has been attained with twenty volts and opposite reproduction with ten volts.

Figure 2:
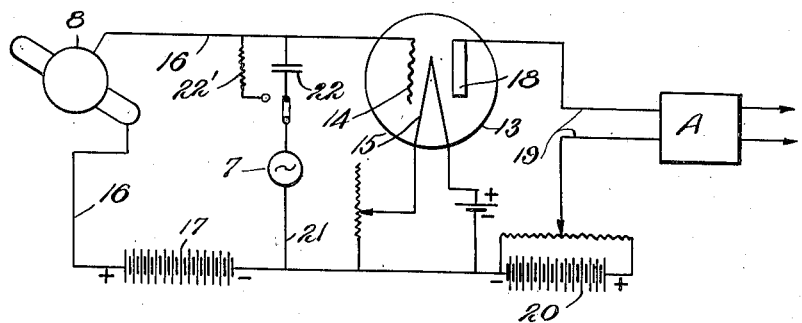
Fig. 2 is a simplified diagram of the circuit connections.

By reference to Fig. 2 it is evident that the source of pulsating current (the secondary of transformer 7 in Fig. 1) is connected to the grid 14 and cathode 15 in series with the high impedance (condenser 22 or resistance 22') and that the photo-electric cell is connected in a branch circuit bridging the high impedance and also the pulsating current source.

Figures 3, 4:
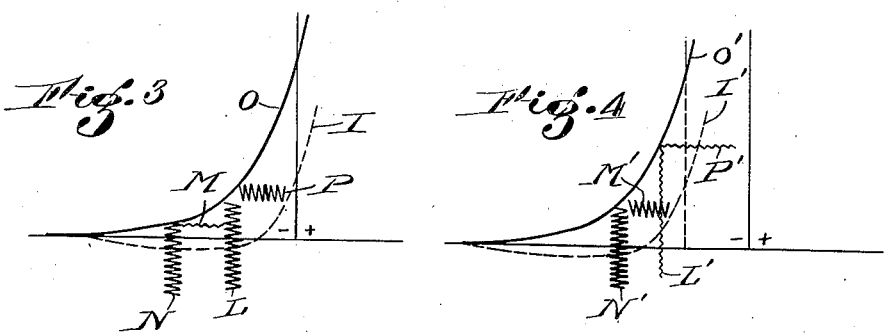
Figs. 3 and 4 are curves explanatory of the principle of operation.

The principle of operation of the apparatus is believed to be substantially as illustrated in Figs. 3 and 4 wherein abscissae represent potentials and ordinates represent currents. O and O' are the plate-current grid-voltage curves and I and I' are the grid-current grid-voltage curves of the electron discharge device. N and N' represent variations of grid potential produced by pulsating source 7 when little or no light is reflected to the photo-electric cell; M and M' represent variations in the plate current produced by potential variations N and N'; L and L' represent variations of grid potential by pulsating source 7 when light is reflected to the photo-electric cell; and P and P' represent variations in the plate current, produced by potential variations L and L'.

Fig. 4 differs from Fig. 3 in that the zero potential line is shifted to the right (or conversely the current curves are shifted to the left) as a result of increase of potential in the output circuit produced by adjustment of battery 20.

Referring particularly to Fig. 3 the plate current variations P (when light strikes the cell) are more intense than variations M (when little or no light strikes the cell) for the reason that the potential variations L are impressed at a relative steep region of the plate current curve O compared to the region where the potential variations N are impressed. Consequently the transmitted impulses have greater amplitude when transmitting high-lights; and opposite reproduction results.

Referring now to Fig. 4, which represents the conditions prevailing when the potential of source 20 is increased, the current variations M', when no light strikes the cell, are large because the increase of potential 20 has shifted the curves so that potential variations N' are now impressed at a relatively steep region of the output current curve. On the other hand the current variations P', when light strikes the cell, are small for the reason that the potential variations L' are impressed at a relatively high region of the grid current curve I' where the low-power alternating-current source is unable to vary the grid potential in substantial degree because of the relatively high input or grid current I'. Consequently the transmitted impulses have greater amplitude when transmitting shadows; and like reproduction results.

Inasmuch as the cell 8 is connected across the cathode and grid of the audion variations in cell resistance vary the potential leakage from grid 14 and thereby vary the average potential on the grid, thus explaining why the potential variations N and L (also N' and L') are horizontally displaced in Figs. 3 and 4.

The impedance 22 or 22' which is high compared to the resistance of cell 8, prevents substantial grid leakage through branch 21 and enables cell 8 to control the leakage.

The term grid is employed to connote either a single grid element or a multiple grid consisting of two or more grid elements.

As disclosed in said copending application either the same or different pulsations may be employed to transmit the subject-matter and to synchronize the receiving apparatus with the sending apparatus.

I claim:

1. Photo-telegraphic apparatus comprising an audion having a grid, means for continually supplying a pulsating potential to the grid, means for leaking electrical charge from the grid in response to light, and means for shifting the characteristic curves with respect to the grid potential to control the character of transmission.

2. Photo-telegraphic apparatus comprising an audion having a cathode and a grid, a source of pulsating current in a series circuit including the grid, a photo-electric cell in parallel with a portion of said circuit, and means for shifting the characteristic curves with respect to the grid potential to control the character of transmission.

3. Photo-telegraphic apparatus comprising an audion having a cathode and a grid, a source of pulsating current in a series circuit including the grid and a high impedance, a photo-electric cell in parallel with said high impedance, and means for adjusting the position of the characteristic curves with respect to the potential to control the character of transmission.

4. Photo-telegraphic apparatus comprising an audion having a cathode and a grid, a source of pulsating current in a circuit connected between said grid and cathode, said circuit including a high impedance, a branch circuit connected between the grid and cathode, said branch circuit including a photo-electric cell serving as a variable grid leak, and means for adjusting the position of the characteristic curves with respect to the grid potential to control the character of transmission.

5. Photo-telegraphic apparatus comprising an audion having a cathode and a grid, a source of pulsating current in a series circuit including the grid, a photo-electric cell in parallel with a portion of said circuit, and means for reversing the effect of the cell on the pulsations of the plate current of the audion including means for shifting the characteristic curves with respect to the grid potential.

6. Photo-telegraphic apparatus comprising an audion having a cathode and a grid, a source of pulsating current in a series circuit including the grid and a high impedance, a photo-electric cell in parallel with said high impedance, and means for reversing the effect of the cell on the pulsations of the plate current of the audion including means for shifting the characteristic curves with respect to the grid potential.

7. Photo-telegraphic apparatus comprising an audion having a cathode and a grid, a source of pulsating current in a circuit connected between said grid and cathode, said circuit including a source of pulsating potential and a high impedance, a branch circuit connected between the grid and cathode, said branch circuit including a photo-electric cell serving as a variable grid leak, and means for reversing the effect of the cell on the pulsations of the plate current of the audion including means for adjusting the position of the characteristic curves with respect to the grid.

8. Photo-telegraphic apparatus comprising an audion having a cathode and a grid, a source of pulsating current in a series circuit including the grid, a photo-electric cell in parallel with a portion of said circuit, and means for reversing the effect of the cell on the pulsations of the plate current of the audion including an adjustable source of potential in the plate circuit.

9. The art of photo-telegraphic transmission with an audion which comprises continually supplying a pulsating potential to the audion grid, leaking electrical charge from the grid in response to light, and controlling the character of transmission by shifting the characteristic curves with respect to the grid potential.

Signed by me at Boston, Massachusetts this 24th day of November 1924.

AUSTIN G. COOLEY.